United States Patent

Dougherty

[15] 3,642,292
[45] Feb. 15, 1972

[54] SEALING ARRANGEMENT

[72] Inventor: Denis E. Dougherty, 1126 South Country Club Drive, Schenectady, N.Y. 12309

[22] Filed: May 21, 1969

[21] Appl. No.: 826,461

[52] U.S. Cl. ..................................277/56, 277/135 J, 277/1
[51] Int. Cl. ....................................F16j 15/48, F02f 11/00
[58] Field of Search......................277/1, 56, 70, 71, 72, 13, 277/54, 53, 55, 135 J, 68, 69, 135; 308/36.3

[56] References Cited

UNITED STATES PATENTS

| | | | |
|---|---|---|---|
| 775,910 | 11/1904 | Backstrom | 277/54 |
| 1,233,347 | 7/1917 | Hall | 277/13 |
| 1,558,630 | 10/1925 | Reed | 277/13 |
| 1,734,458 | 11/1929 | Allen | 277/13 |
| 1,878,731 | 9/1932 | Thompson | 277/1 |
| 1,932,995 | 10/1933 | Rijswijk | 277/1 |
| 1,965,671 | 7/1934 | Schnetzler | 277/1 |

FOREIGN PATENTS OR APPLICATIONS

| | | | |
|---|---|---|---|
| 712,188 | 10/1941 | Germany | 277/13 |

*Primary Examiner*—Samuel B. Rothberg
*Attorney*—Edward P. Brandeau

[57] ABSTRACT

A way of improving the efficiency of gland seals of a large steam turbine comprising injecting into the seals a sacrificial bleed of low-energy fluid. This reduces the energy leakage of the gland seals and thus increases overall power plant efficiency.

4 Claims, 4 Drawing Figures

INVENTOR
DENIS E. DOUGHERTY

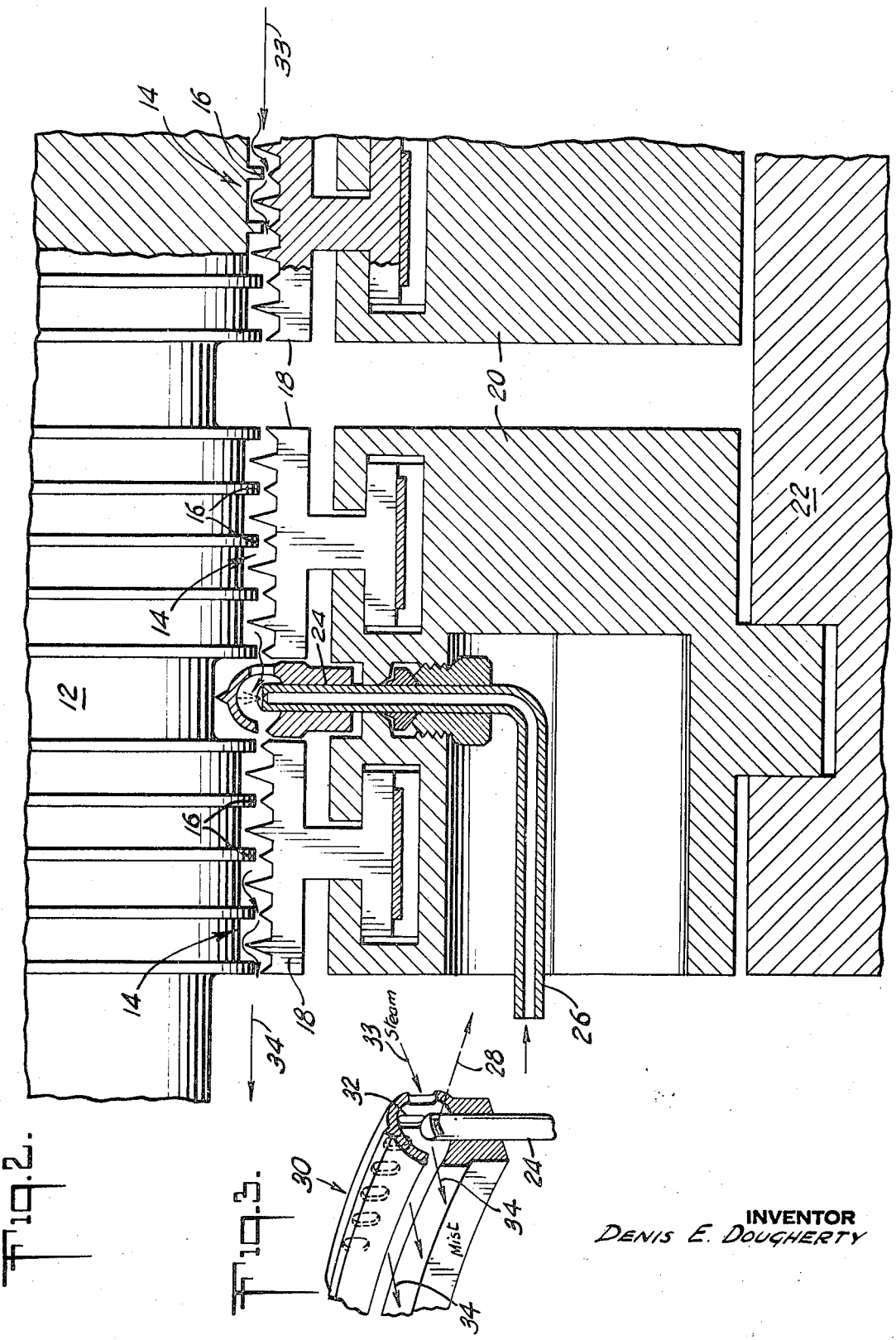

SEALING ARRANGEMENT

This invention relates to an improved way of sealing against steam loss through the rotating shaft seals of high-temperature steam turbines.

An object of this invention is to substantially reduce the energy loss due to steam escaping through the gland seals of a turbine.

A further object is to provide a relatively simple and inexpensive arrangement for use in conjunction with labyrinth seals to reduce energy loss through the seals.

Still another object is to provide such an arrangement which can be retrofitted onto existing turbines to make their shaft seals more efficient.

These and other objects will in part be understood from and in part pointed out in the following description.

In a large, high-pressure, high-temperature steam turbine, to which the present invention is particularly applicable, energy leakage losses of the end packing seals are greater than 3 percent of the average plant heat rate. These losses are caused by leakage of steam from the high-pressure interior of the turbine shell along the turbine shaft where it passes through the shell. In the past various attempts have been made to seal the shaft and prevent energy loss. Typical of the better seals previously known is a labyrinth seal arrangement, such as disclosed in U.S. Pat. No. 2,600,991. The present invention provides a way of reducing by approximately half the energy loss through a typical prior art seal, such as that shown in the above-mentioned patent. From the economic point of view, a reduction by half of a 3 percent energy loss is annually worth roughly $30,000 per 100 million watts of generating capacity, based on typical fuel savings per year.

The present invention is based on the realization that the specific energy of the steam leakage flow through a seal (such as mentioned above) is substantially reduced by injecting into the clearance seal a fluid (water) having a specific enthalpy less than that of the primary steam leakage flow. The leakage mass flow rate of the sealant mixture is reduced by increasing the specific volume of the mixture within the clearance seal and by the increased frictional dissipation losses of the mixture. The specific volume of the sealant mixture is increased by flashing and evaporating the injected sealant fluid within the seal. The low-energy fluid (injected according to the invention) is caused to flash and evaporate as a result of one or more of the following evaporative processes:

a. Flashing due to expansion of the injected fluid through a restriction to a pressure which is less than the fluid vapor pressure.
b. Evaporation of the fluid as it is transported through the region of decreasing vapor pressure in the clearance seal.
c. Evaporation of the fluid when it impinges on the superheated walls of the clearance seal.
d. Evaporation due to heat transfer from the high energy component to the low-energy component of the sealant mixture.

The first three processes increase the specific volume of the mixture and thereby decrease the leakage mass flow rate of the sealant mixture. The fourth process of evaporation, however, decreases the specific volume of the mixture when the high energy component of the sealant mixture is a vapor. This is caused by the fact that the heat exchange process reduces the specific energy of the vapor phase component of the mixture. It is important, therefore, in the case of a vapor seal to suppress evaporation due to heat transfer from the high energy vapor component to the low energy component of the sealant mixture.

Since evaporation by the heat exchange process proceeds at a finite rate, this process can be suppressed by having the mixture of the high-energy vapor and low-energy liquid travel through the clearance seal before a significant amount of heat exchange between the components can take place. The heat exchange process is regulated by controlling the specific surface area of the injected liquid component, e.g., controlling the quantity and size of droplets sprayed into and mixed with the primary vapor sealant. Also, the heat exchange process is controlled by the temperature differential between the vapor and the injected liquid phases.

It should be noted that in the case of a vapor seal the first three processes of flashing and evaporation itemized above proceed at rates much greater than the heat exchange evaporation process. Thus the specific volume of a vapor-liquid mixture can be increased when evaporation by the heat exchange process has been effectively suppressed by the design of the injection seal.

The frictional dissipation losses of a multicomponent mixture are increased by inducing relative motion between the component fluids within the clearance seal. The rapid acceleration and deceleration of the flow within a labyrinth clearance seal will induce periodic relative motion between mixture components of different density thus increasing the frictional pressure loss within the seal.

In accordance with the present invention, in one specific embodiment thereof, a plurality of fluid injector nozzles are placed around a turbine shaft intermediate the ends of a labyrinth seal. These nozzles inject a low-energy liquid within the clearance between shaft and seal where the liquid is atomized and mixed with the primary vapor sealant (steam leaking from the turbine). The nozzles inject the liquid tangentially into the clearance to obtain a vapor-liquid mixture of approximately 50 percent quality (vapor weight fraction) and to give liquid droplets having a mean diameter of 40-60 microns. The axial location of the injectors has been chosen to suppress evaporation within the final labyrinth packing ring due to heat exchange between the vapor and liquid phases [evaporative process (d) above]. The location is determined by the ratio of the mixture transit time and the evaporation time of the liquid droplets in the high temperature vapor environment. Also, the temperature of the injected liquid is regulated so that the seal pressure at the point of injection is less than or equal to the vapor pressure of the injected liquid [evaporative process (a) above]. The illustrated injection vapor-seal design will also cause evaporation of the injected liquid within the downstream packing ring due to evaporative process (b) and (c) described above. The injected liquid droplets entrained in the primary sealant vapor and carried through the downstream packing ring increase the frictional dissipation losses of the sealant flow through the labyrinth seal stages and thus help decrease energy loss to the outside.

The injection vapor-seal design according to the invention will reduce the energy leakage rate of a conventional labyrinth seal by one-half when the enthalphy of the primary sealant is greater than 1,400 B.t.u./pound, with or without a packing gland bleed off.

A better understanding of the invention together with a fuller appreciation of its many advantages will best be gained from the following description given in connection with the accompanying drawings wherein:

FIG. 2 is an enlarged section view taken as indicated by lines 2—2 in FIG. 1;

FIG. 3 is a perspective view of an injector nozzle; and

Figure 1:
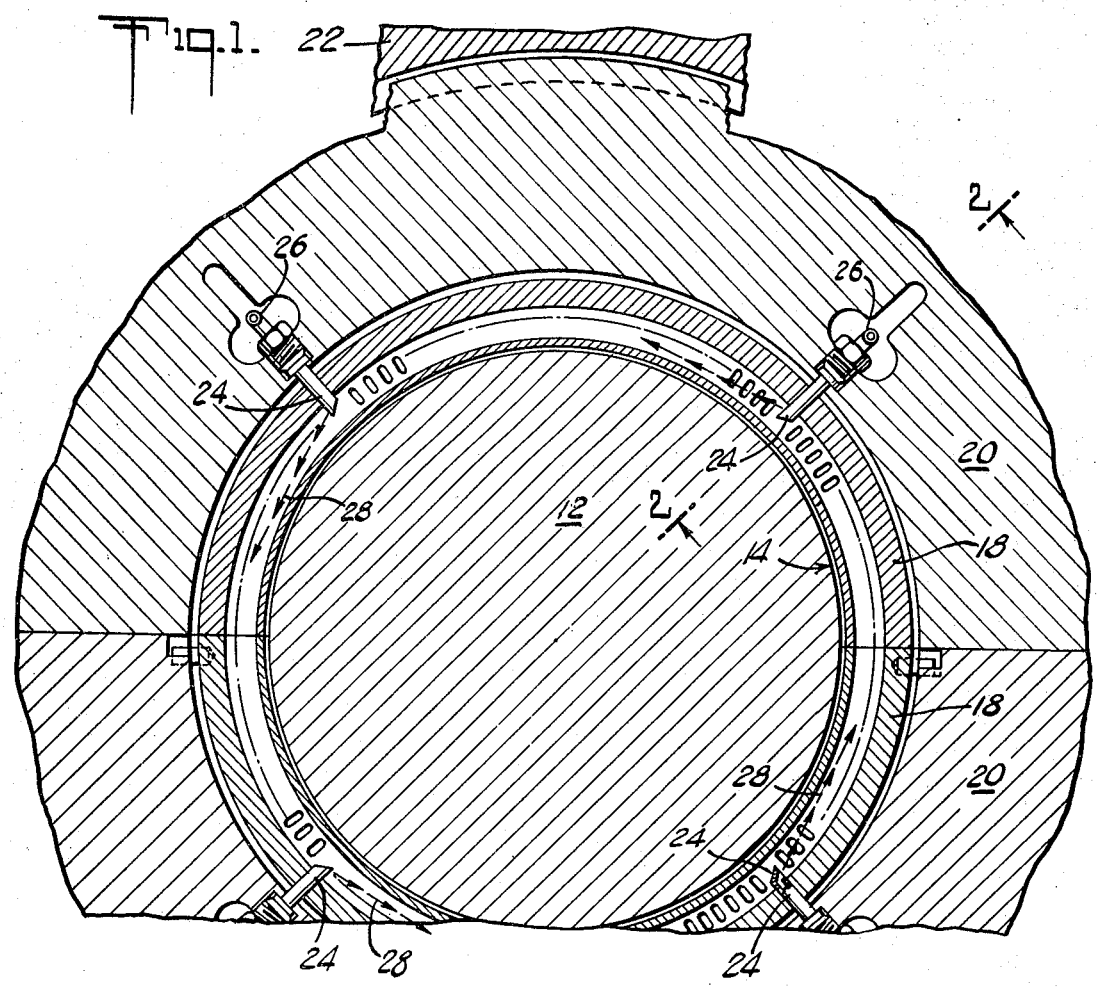
FIG. 1 is a cross section of a turbine shaft and the surrounding seal provided according to the invention.

As seen in FIG. 1, a turbine shaft 12 extends on an axis perpendicular to the plane of the drawing. The shaft is mounted in bearings (not shown) and is surrounded by a seal, generally indicated at 14. A rotatable part 16 of the seal is integral to the shaft, and a stationary part 18 of the seal is mounted within a casing 20 in turn mounted within housing 22 of the turbine. Seal 14 is a labyrinth type of seal, and has an axial section as shown in FIG. 2.

Positioned respectively at 90° intervals around shaft 12 within seal 14 are four injector nozzles 24. Each is supplied with sacrificial bleed liquid by a connection 26 leading to the turbine boiler supply (not shown). As seen in FIGS. 1 and 3, each nozzle injects tangentially into the seal liquid droplets, indicated by arrows 28. Nozzles 24 project into and are shrouded by an annular member 30 which, as seen best in FIG. 3, has side openings 32. The droplets injected by nozzles 24 mix with the primary sealant (arrow 33 in FIG. 2) and flow downstream through the seal as indicated by arrows 34 in FIGS. 2 and 3, and are exhausted to a condenser, for example. The presence of the injected liquid inhibits energy loss due to leakage of the primary sealant, as explained previously.

The nozzles inject the liquid tangentially into the clearance to obtain a vapor-liquid mixture of approximately 50 percent quality (vapor weight fraction) and liquid droplets having a mean diameter of 40–60 microns. The axial location of the injectors has been chosen to suppress evaporation within the downstream (two phase) labyrinth seal ring due to heat exchange between the vapor and liquid phases [evaporative process (d) above]. The location is determined by the ratio of the mixture transit time and the evaporation time of the liquid droplets in the high temperature vapor environment. This ratio of mixture transit time ($T_t$) and droplet evaporation time ($T_D$) is given as $$\frac{T_t}{T_D} = 8 \left(\frac{V}{\delta}\right) \left(\frac{k_v}{k_1}\right) \left(\frac{\alpha_e}{D_m^2}\right) \left[\left(\frac{1+\epsilon_i}{1-\epsilon_i}\right) \left(\frac{Z^3}{p_i V_{vi}}\right)\right]^{1/2} \quad (1)$$

where
$V$ = Volume of a single labyrinth stage
$\delta$ = Flow area of a labyrinth stage restriction
$k_v$ = Thermal conductivity of the vapor (stream) phase
$k_1$ = Thermal conductivity of the liquid droplets
$\alpha_e$ = Thermal diffusivity of the liquid droplets
$D_m$ = Mean liquid droplet diameter
$\epsilon_i$ = Mixture moisture fraction (by weight) at the point of injection
$Z$ = Number of downstream labyrinth stages
$p_i$ = Pressure at the point of injection
$V_{vi}$ = Specific volume of the vapor at the point of injection.

To suppress evaporation due to heat exchange between the vapor and liquid phases the ratio ($T_t/T_D$) given by formula (1) should be less than unity. In typical turbine end seal steam conditions and labyrinth stage configurations, $T_t/T_D$ is less than one when $D_m$=50 microns, $Z$=9, and the injected moisture fraction ($\epsilon_i$) is 50 percent (50 percent steam quality). The axial position of the injectors is thus determined by the allowable number and dimensions of the downstream labyrinth seal stages. Having determined the axial position of the injectors using formula (1), the temperature of the injected liquid (water) is regulated so that the liquid vapor pressure is greater than or equal to the pressure at the position of these injectors [evaporative process (a) above].

The illustrated injection vapor-seal arrangement will also cause evaporation of the injected liquid downstream due to evaporative process (b) and (c) described above. The liquid droplets entrained in the vapor (primary sealant) and carried through the downstream section of the seal increase the frictional dissipation losses of the sealant flow through the labyrinth seal stages.

Figure 4:
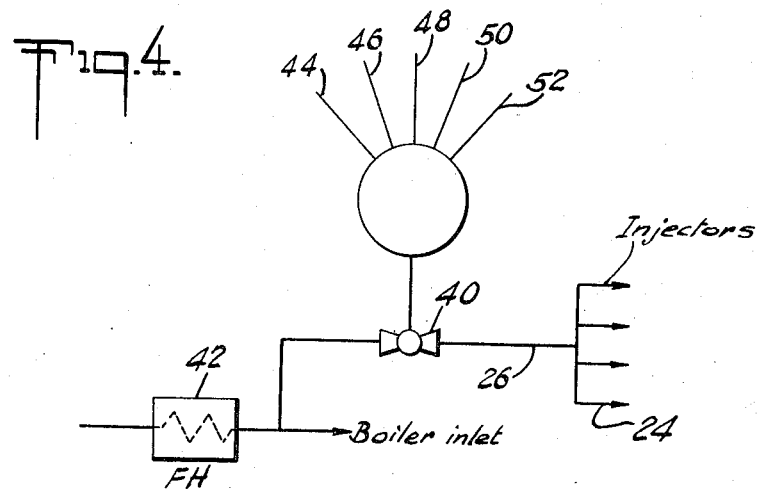
FIG. 4 is a schematic diagram of the controls for the injectors provided according to the invention.

FIG. 4 shows schematically injectors 24, and connections 26. A fast-acting valve 40 controls the flow of liquid from the boiler supply 42. Valve 40 is controlled by the following: start, stop relay 44, injector low-pressure drop trip 46, low gland exhaust steam temperature trip 48, low steam chest pressure trip 50, and load limit trip 52.

The above description is intended in illustration and not in limitation of the invention. In particular, the invention is not limited to the illustrated method of mounting the injection seal nor to the particular labyrinth configuration shown in FIG. 3. Various changes or modifications in the embodiment described may occur to those skilled in the art and can be made without departing from the spirit or scope of the invention as set forth.

I claim:

1. In a steam turbine seal arrangement of the character described, a turbine shaft, a labyrinth seal around said shaft and having a plurality of sections, including an upstream and a downstream section, injector means to inject low energy fluid into said seal, said means comprising a plurality of nozzles for injecting droplets of liquid into the seal between its downstream section and the section adjacent thereto, the droplets of liquid being finely divided and controlled in quantity and size range, said nozzles being located at a place along said seal to suppress evaporation of said droplets due to heat exchange between the liquid and the vapor phases within the downstream end of said seal, and means to supply low energy liquid in a controlled amount to said nozzles to control energy leakage of the primary fluid through said seal whereby efficiency is optimized.

2. The arrangement in claim 1 wherein said nozzles inject droplets in the range of 40 to 60 microns in diameter, said supply means controlling liquid supply to obtain a 50 percent quality vapor-liquid mixture in the region of said nozzles.

3. The arrangement in claim 1 wherein the axial location of said nozzles provides a transit time of the primary fluid-droplet mixture less than the droplet evaporation time.

4. An improved energy sealing arrangement of the character described comprising a shaft such as a steam turbine shaft, a labyrinth primary fluid seal around said shaft which includes an upstream and a downstream seal section, nozzle means for injecting finely divided droplets of low energy liquid into said seal near its downstream section, and means to supply a regulated flow of low energy liquid in a controlled amount to said nozzles, the axial placement of said nozzle means being located to suppress evaporation of the injected droplets in the downstream section of said seal, said supply means regulating the vapor pressure of the injected liquid to a value equal or greater than the pressure in said seal at the position of said nozzle means.

* * * * *